United States Patent [19]

Cavalieri

[11] Patent Number: 4,829,720
[45] Date of Patent: May 16, 1989

[54] TURBINE BLADE POSITIONING FIXTURE

[76] Inventor: Dominic A. Cavalieri, P.O. Box 248, Hibernia Rd., Salt Point, N.Y. 12578

[21] Appl. No.: 208,983

[22] Filed: Jun. 20, 1988

[51] Int. Cl.$^4$ ............................................. B24B 41/06
[52] U.S. Cl. ............................ 51/217 R; 29/156.8 B; 269/296
[58] Field of Search ............. 51/217 R, 217 A, 217 P, 51/216 R, 277; 269/296, 297, 237, 238, 46, 93, 94, 900; 29/156.8 B

[56] References Cited

U.S. PATENT DOCUMENTS 4,638,602  1/1987  Cavalieri ........................... 51/217 R Primary Examiner—Frederick R. Schmidt
Assistant Examiner—Maurina Rachuba
Attorney, Agent, or Firm—Laubscher, Presta & Laubscher

[57] ABSTRACT

A turbine blade positioning fixture for accurately positioning a turbine blade relative to its stacking axis during a grinding of the blade root form is characterized by a unique positioning assembly which enables the operator to quickly insert and remove turbine blades relative to the fixture for accurate uniform positioning of successive blades. The fixture includes a rigid base for supporting spaced sections of the air foil portion of a turbine blade, and a locator pin is connected with the base for abutment against the datum point of the blade. A spring-biased upper block is resiliently connected with the base to exert a positioning force on the surface of the air foil portion of the turbine blade to urge the blade against the support of the fixture base and against the locator pin. More particularly, the upper block and the base define a cavity therebetween for receiving the air foil portion of a turbine whose root form is to be ground. The lower surface of the upper block includes a dowel which is adapted to contact the surface of the turbine blade and urge the turbine blade against the support of the fixture base. The fixture is configured to fit within the V-blocks of a clamping mechanism, whereby when a turbine blade is accurately positioned with the fixture, the fixture and blade are positioned within the blocks of the clamping apparatus to clamp the blade in the desired position relative to the stacking axis. In this immovable position, the blade root form portion may then be accurately ground by a grinding tool.

9 Claims, 3 Drawing Sheets

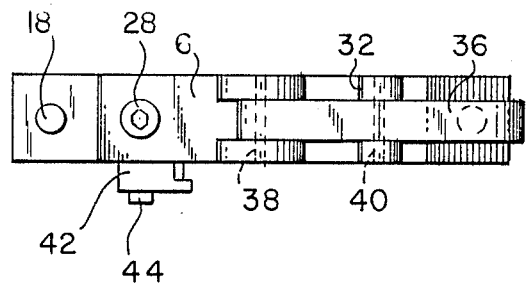
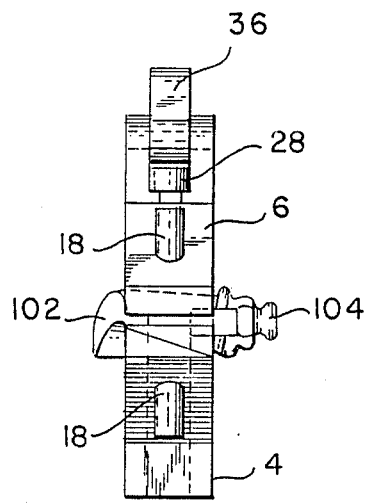
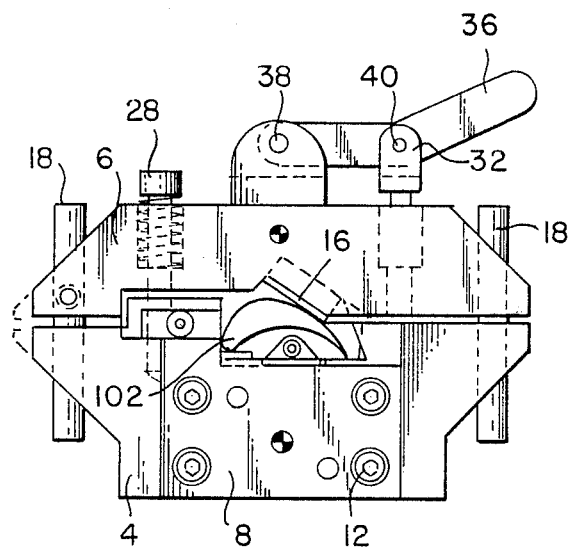
FIG. 5  FIG. 3
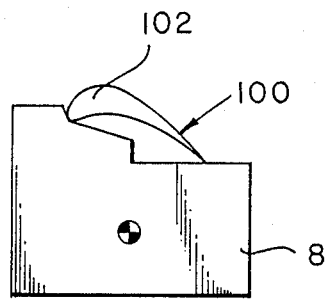
FIG. 6

TURBINE BLADE POSITIONING FIXTURE

BACKGROUND OF THE INVENTION

The present invention relates to an improved fixture for accurately positioning a turbine blade relative to its stacking axis during grinding of the blade root form portion. Accurate positioning of the blade enables more precise machining of the blade root form, resulting in improved tolerances of the entire blade configuration.

BRIEF DESCRIPTION OF THE PRIOR ART

Turbine blade holding devices are well-known in the patented prior art, as evidenced by the Cavalieri U.S. Pat. No. 4,638,602 which is incorporated herein by reference. The blade holding device disclosed in the Cavalieri patent includes a base including front and rear datum plates for supporting spaced sections of the air foil portion of the turbine blade and a longitudinal pin adapted to abut against the datum point of the blade. A clamping mechanism including an elongated clamp is pivotally connected with the base and arranged along the fulcurm of the blade air foil portion.

The blade holding device of the Cavalieri U.S. Pat. No. 4,638,602 is a self-contained clamping device which is used to rigidly secure an individual turbine blade for grinding of the root form by an adjoining grinding or machining tool. The clamping device works quite well for holding a single blade, and a plurality of the clamping devices may be arranged about the grinding wheel for working a plurality of blade root forms simultaneously or in succession. One major drawback of the prior clamping device is the amount of time required to remove a worked blade and insert a successive blade due to the rather laborious manual operation of the clamping mechanism. A second drawnback of the prior device is that it is unsuitable for use with conventional lead block mounting fixtures which have long been used to hold the turbine blade during grinding.

The present invention was developed in order to complement the prior Cavalieri turbine blade holding device by providing a fixture which accurately positions a turbine blade relative to its stacking axis. Although the fixture does not—standing alone—clamp the turbine blade to rigidly hold the blade during griding, it is configured to fit within a conventional mounting fixture which provide the clamping forces to the positioning fixture necessary to rigidly hold the blade. The fixture according to the invention is operable to position and release successive turbine blades much more quickly than the prior blade holding device.

SUMMARY OF THE INVENTION

Accordingly, it is a primary object of the present invention to provide a fixture for accurately positioning a turbine blade relative to its stacking axis during grinding of the blade root form portion. The fixture includes a base having first and second datum plates connected therewith for supporting the leading and trailing edges of the blade. A locator pin is also connected with the base adjacent the first datum plate and is adapted to abut against the datum point of the turbine blade. An upper block is resiliently connected with the base to define a cavity between the upper block and the base for receiving the turbine blade. The upper block is normally biased in the direction toward the base to urge a turbine blade aranged in the cavity against the first and second datum plates with the blade datum point abutted against the locator pin, whereby the blade is accurately positioned wtihin the fixture relative to a stacking axis for accurate grinding of the root form portion of the blade.

According to a further object of the invention, the fixture also includes a handle connected with the upper block for displacing the block away from the base against the biasing forces normally directed against the upper block to enlarge the cavity defined between the block and the base. With the handle, the upper block and base may be quickly separated to enable easy removal of a blade whose root form portion has been ground and rapid insertion of a subsequent blade to be ground. Upon releasing the handle, the upper block is quickly positioned against the blade to urge the blade against the datum blades of the base owing to the resilient biasing forces provided between the upper block and the base.

It is yet another object of the invention to provide the upper block and the base with the tapered configuration so that when the fixture is arranged in a clamping mechanism, the upper block is clamped to the base to securely hold a turbine blade arranged therebetween in the desired position relative to its stacking axis.

It is another object of the invention to provide a dowel connected with the lower portion of the upper block which is arranged to contact the surface of the air foil portion of the blade when the upper block is biased toward the base in order to urge the blade against the datum plates.

According to a more specific object of the invention, the datum plates each include a horizontal support edge and an inclined edge against which the front leading portion of the blade is urged by the dowel on the upper block. The first datum plate, which is adjacent the locator pin, supports the leading and trailing edges of a first section of the turbine blade. The second datum plate, which is spaced from the first datum plate, supports the leading edge of a second section of the turbine blade.

BRIEF DESCRIPTION OF THE DRAWING

Other objects and advantages of the subject invention will become apparent from a study of the following specification when viewed in the light of the accompanying drawing, in which:

FIGS. 3, 4 and 5 are front, top and left side plan views, respectively, of the fixture of FIG. 2;

FIG. 6 is a front plan view of the first datum plate supporting the leading and trailing edges of a section of the air foil portion of a turbine blade.

DETAILED DESCRIPTION

Figure 2:
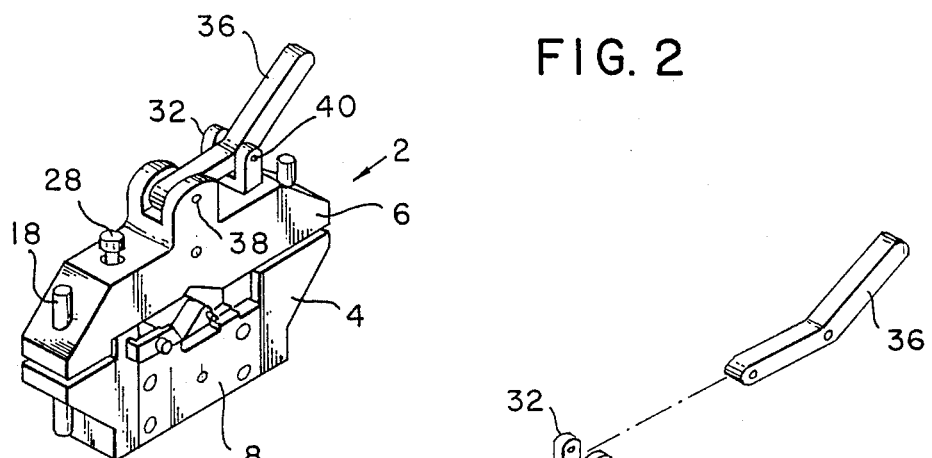
FIG. 2 is a perspective view of the fixtue of FIG. 1 in its assembled condition.
Figure 1:
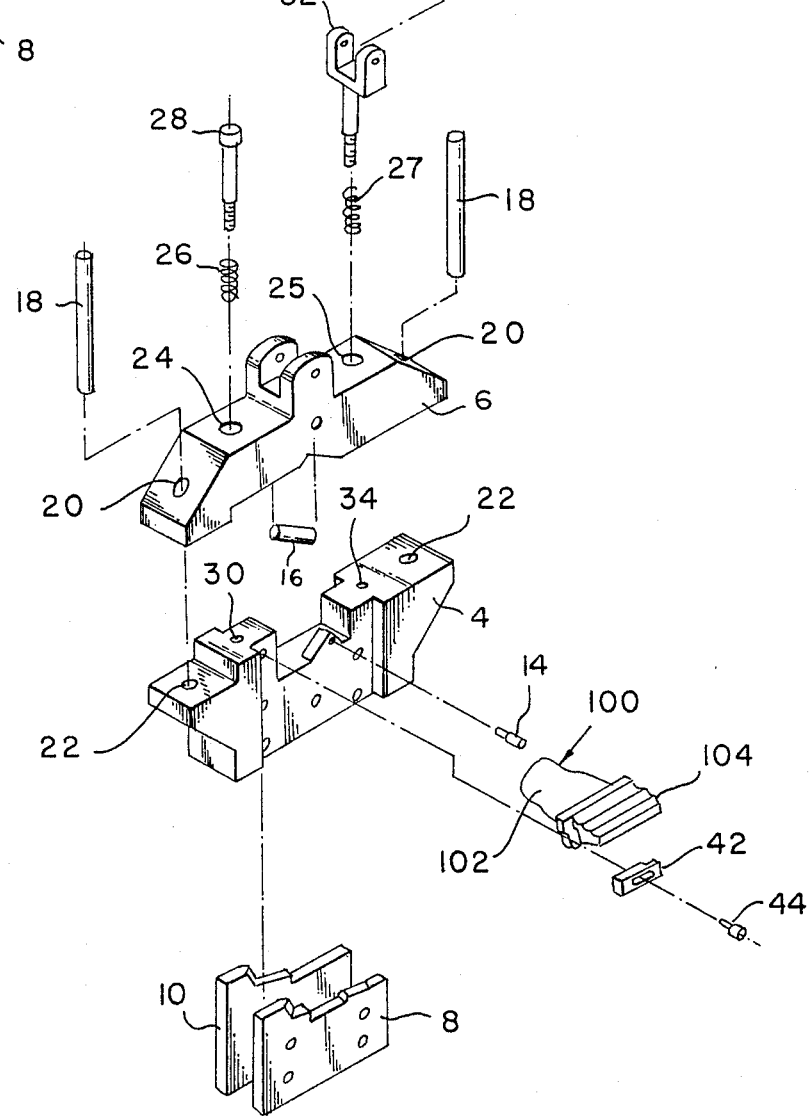
FIG. 1 is an exploded perspective view of the turbine blade positioning fixture according to the invention.

Referring first to FIGS. 1 and 2, the turbine blade positioning fixture 2 will be described. The fixture includes a rigid base 4 and an upper block 6 both of which are formed out of a suitable rigid, durable material such as stainless steel or the like. Connected with the base are a first datum plate 8 and a second datum plate 10. The first datum plate is connected with the front portion of the base as shown in FIGS. 2 and 3, and the rear datum plate 10 is connected with the rear portion of the base as shown in FIGS. 5. The datum plates may be connected with the base by any suitable means such as screws 12 as shown in FIG. 3 which pass through openings in the datum plates and are threadably connected with threaded openings in the base. Also connected with the base at the front surface thereof above the first datum plate 8 is a locator pin 14 which, as will be developed in greater detail below, is adapted to abut against a datum point on the turbine blade arranged in the fixture. The locator pin 14 serves as a stop for the root form portion 104 of the blade 100 when the blade is arranged in the fixture.

The upper block 6 includes a dowel 16 connected with the bottom portion thereof. The dowel is adapted to engage the surface of the air foil portion 102 of the blade 100 when the blade is arranged within the fixture. Vertical dowels 18 at the sides of the upper block are adapted to pass through aligned openings 20, 22 contained in the upper block and the base, respectively. The dowels 18 enable the upper block to be displaced vertically relative to the base while still being properly aligned therewith. The upper block also contains second openings 24, 25 for receiving springs 26, 27 therein. A bolt 28 passes through the left spring 26 and through the left second opening 24 and is threadably connected with an opening 30 contained in the base. Similarly, a bracket 32 passes through the right spring and right second opening 25 in the upper block and is threadably connected with the base via a threaded opening 34 aligned with the opening 25 in the upper block. The block 28 and bracket 32 serve to connect the upper block with the base, and the springs 26, 27 afford resiliency with this connection. The springs also normally bias the upper block toward the base.

A handle 36 is connected with the upper block 6 via a horizontal pin 38 as shown in FIG. 2 and with the bracket 32 via a second horizontal pin 40 and is operable to lift the upper bracket away from the base against the biasing force of the springs to increase the distance between the upper block and the base. As shown more particularly in FIG. 3, the upper block and the base define a cavity therebetween for receiving the turbine blade 100.

The handle 36 is manually lifted to raise the upper block away from the base to enable the operator to position a turbine blade in the cavity defined between the block and base. When the handle is released, the springs 26, 27 bias the upper block downwardly toward the base, and the dowel 16 connected with the upper block engages the surface of the air foil portion 102 of the turbine blade as shown in FIG. 3. Further downward movement of the upper block under the influence of the springs causes the dowel to press against the turbine blade air foil portion and to urge the blade against the datum plates. As shown in FIGS. 1 and 6, the datum plates each include a horizontal support edge and an inclined edge against which the front leading portion of the blade is urged as shown in FIG. 3. The first datum plate 8 is designed to support both the leading and trailing edges of a first section of the turbine blade air foil portion while the second datum plate 10 supports at least the leading edge of a spaced section of the blade air foil portion. The datum plates are designed for supporting different edges of the blade owing to the configuration of the blade air foil portion as shown in FIG. 5.

The resilient, biased connection between the upper block 6 and the base 4 has a natural tendency to properly position the turbine blade against the first and second datum plates and against the locator pin so that the blade is properly aligned relative to its stacking axis. The upper block assumes a normal rest position with the turbine blade aranged between the block and the base when the turbine blade is snugged up into the desired position by the resilient biasing forces of the springs and the force applied by the dowel 16 against the turbine blade. Once the blade is properly positioned, an auxiliary clamping device 42 is connected with the base 4 via a screw 44 to retain the root form portion 104 of the blade 100 against the locator pin 14.

Figure 7:
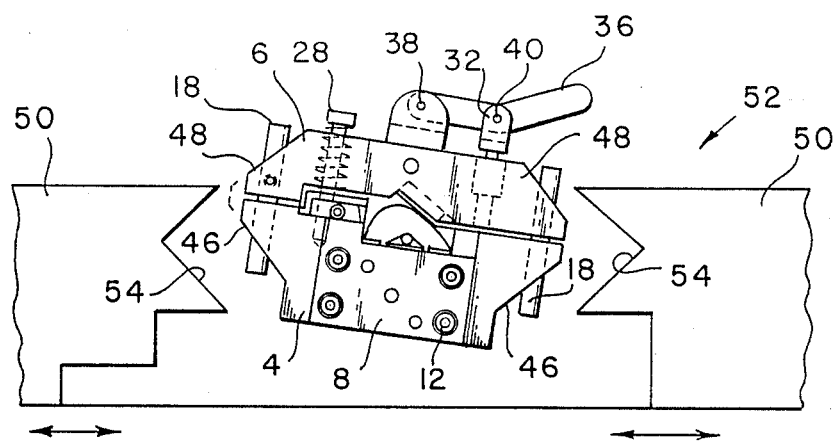
FIGS. 7, 8 and 9 are front plan views of a clamping mechanism illustrating the progressive clamping steps for receiving the fixture, aligning the fixture, and clamping the fixture upper block to the base to securely grip the turbine blade in the desired position for accurate machining of the root form portion thereof.
Figure 8:
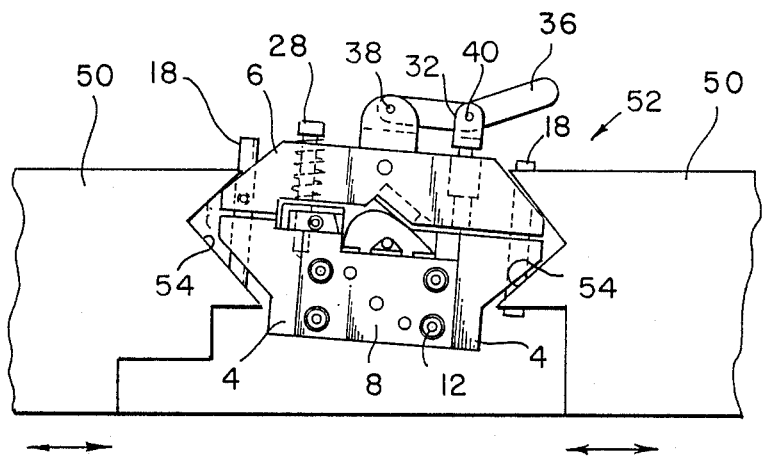
Figure 9:
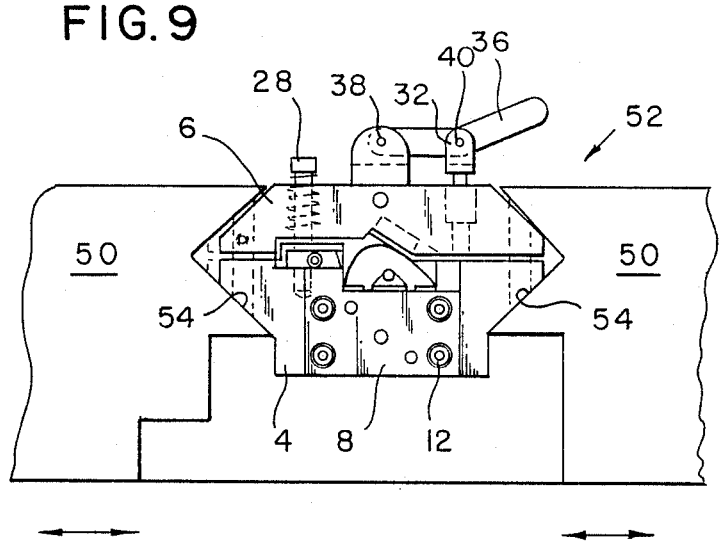

Although the turbine blade positioning fixture according to the invention is designed to properly position a turbine blade relative to its stacking axis, the fixture standing alone is not capable of securely clamping a turbine blade in order to grind the root form portion thereof. Accordingly, the fixture is designed to fit within the recess of a movable chuck of a clamping apparatus as shown in FIGS. 7, 8 and 9. More particularly, as shown in FIG. 7 the fixture base 4 has tapered side walls shown by reference numeral 46 and the fixture upper block 6 has tapered side walls shown at 48. The angle defined between the tapered side walls of the upper block and base is on the order of 90°, whereby the side walls of the fixture are received within the blocks 50 of the clamping apparatus 52. More particulary, the V-blocks 50 of the clamping apparatus are laterally displaceable toward and away from each other as shown by the arrows of FIG. 7, 8 and 9. In the position of FIG. 7, the V-blocks 50 are spaced from each other to receive the fixture containing the turbine blade whose root form portion is to be machined. The V-blocks each contain recesses 54 having a configuration corresponding generally with the 90° angle defined by the tapered side walls 46, 48 of the fixture base and upper block, respectively.

With the fixture generally arranged between the opposing recessed walls of each V-block 50, the V-blocks are moved toward one another as shown in FIG. 8 whereby the fixture is nestled in the grooves 54 of each block. Further movement of the V-blocks 50 toward one another locks the fixture therebetween, with the tapered side wall portions of the fixture arranged in the recesses 54 of each V-block. The lateral forces applied to the fixture by the V-blocks 50 serves to compress the upper block of the fixture against the base of the fixture to securely grip the fixture within the clamping apparatus. With the upper block of the fixture compressed against the base thereof, the upper block dowel 16 is pressed against the air foil surface of the turbine blade to such a degree as to rigidly secure the turbine blade in its desired position relative to the stacking axis. Once secured in this position as shown in FIG. 9, the root form portion of the turbine blade may be ground by a grinding apparatus (not shown). Because of the secure clamping of the blade and fixture within the clamping apparatus 50, the blade is prevented from even minute displacement relative to its stacking axis during the grinding operation, whereby more precise grinding of the root form portion to specification is obtained.

The V-shaped nesting design of the tapered fixture walls relative to the recesses 54 of the clamping V-blocks 50 maintains the proper position of the root form portion of the turbine blade to the grinding wheel location regardless of the thickness of the turbine blade sections as cast in a mold. When the fixture is utilized in a grinding machine to centralize and maintain proper position of the turbine blade root form portion for grinding, the stacking axis of the blade will be properly positioned in relation to the grinding wheels regardless of blade to blade thickness variations. Thus, the turbine holding fixture of the present invention may be used to position turbine blades which might vary slightly, as a result of the molding process, in the dimensions of the air foil portion. However, use of the fixture will still allow proper machining of the root form portion of the slightly varied blades to increase the reliability of the turbine blades when mounted in an assembly such as an aircraft engine or the like.

While in accordance with the provisions of the patent statute, the preferred forms and embodiments of the invention have been illustrated and described, it will be apparent to those of ordinary skill in the art that various changes and modifications may be made without deviating from the inventive concepts set forth above.

What is claimed is:

1. A fixture for accurately positioning a turbine blade relative to its stacking axis, comprising
   (a) a base including means for supporting the leading and trailing edges of the blade;
   (b) locator means connected with said base for abutment against the datum point of the blade;
   (c) an upper block;
   (d) means for connecting said upper block with said base and affording reciprocal movement of said upper block relative to said base, said upper block and said base defining a cavity for receiving the turbine blade; and
   (e) means for normally biasing said upper block toward said base relative to said connecting means for urging the turbine blade against said support means with the blade datum point abutted against said locator means.

2. A fixture as defined in claim 1, and further comprising means for displacing said upper block against the biasing force of said connecting means to increase the spacing between said base and said upper block to insert and remove turbine blades relative to said cavity.

3. A fixture as defined in claim 2, wherein said support means comprise a pair of spaced datum plates connected with said base.

4. A fixture as defined in claim 3, wherein one of said datum plates supports the leading and trailing edges of a first section of the turbine blade and the other of said datum plates supports the leading edge of a second section of the turbine blade.

5. A fixture for accurately positioning a turbine blade relative to its stacking axis during grinding of the blade root form, comprising
   (a) a base including means for supporting the leading and trailing edges of the blade;
   (b) locator means connected with said base for abutment against the datum point of the blade;
   (c) an upper block connected with said base by resilient connecting means, said upper block and said base defining a cavity for receiving the turbine blade, said connecting means normally biasing said upper block toward said base for urging the turbine blade against said support means with the blade datum point abutted against said locator means;
   (d) means for displacing said upper block against the biasing force of said connecting means to increase the spacing between said base and said upper block for insertion and removal of turbine blades relative to said cavity; and
   (e) clamping means including a chamber for receiving said base and said upper block and for clamping said upper block to said base to securely hold a blade arranged therebetween in the desired position.

6. A fixture as defined in claim 5, wherein said upper block and said base have a tapered configuration corresponding with the configuration of said chamber of said clamping means.

7. A fixture as defined in claim 6, wherein said support means comprise a pair of spaced datum plates connected with said base.

8. A fixture as defined in claim 7, wherein said upper block includes means for contacting the surface of the blade to urge the blade against said datum plates.

9. A fixture as defined in claim 8, wherein said datum plates each include a horizontal support edge and an inclined edge against which the front leading portion of the blade is urged by said upper block surface contacting means.

* * * * *